July 8, 1947. R. O. BALOGH 2,423,677
COMPRESSOR PRESSURE CONTROL
Filed Feb. 2, 1946 2 Sheets-Sheet 1

INVENTOR.
ROY O. BALOGH
BY Richey & Watts
ATTORNEYS

INVENTOR.
ROY O. BALOGH
BY Richey & Watts
ATTORNEYS

Patented July 8, 1947

2,423,677

UNITED STATES PATENT OFFICE 2,423,677

COMPRESSOR PRESSURE CONTROL

Roy O. Balogh, Cleveland, Ohio, assignor to The Weatherhead Company, Cleveland, Ohio, a corporation of Ohio Application February 2, 1946, Serial No. 645,191

4 Claims. (Cl. 230—21)

This invention relates to compressors, more particularly to compressors provided with means to adjust the clearance volume in the cylinder for controlling the amount of pressure developed and the work done by the compressor.

The compressor to which this invention relates is one designed to work in a system that includes two or more stages. Heretofore there have been several arrangements for the regulation of the output of a compressor, including devices for adjusting the clearance volume in the compressor cylinder. Devices of the prior art embodied several undesirable features particularly in connection with the high-speed light-weight compressors currently provided in certain auxiliary aircraft installations. Prior devices have been relatively complex and heavy and have required frequent maintenance and adjustment. It is an object of this invention to provide automatic regulation of the developed pressure in a simple manner, by providing a compressor which has relatively few parts, that is light in weight and free of maintenance problems. Generally speaking, this object is attained by providing a movable cylinder head within the compressor cylinder which is automatically positioned to provide a clearance volume of such magnitude that the final pressure of the system remains constant. This cylinder head is controlled by the final or reservoir pressure, that is, the pressure developed by the last stage of the system. This arrangement produces a very sensitive control. Other objects and advantages of this invention will be made apparent to those skilled in the art from the description of the accompanying drawings in which:

As can be seen in the diagram the first stage compressor draws air in at the inlet and compresses it to a certain pre-determined pressure, the outlet of the first stage being connected to the inlet of the second stage. The second stage boosts the pressure to a higher pre-determined value, the outlet of the second stage being connected to a reservoir or receiver or directly to the load. The pressure in the reservoir is also connected to a control port provided in the first stage compressor, the function of which will be expained presently.

Figure 1:
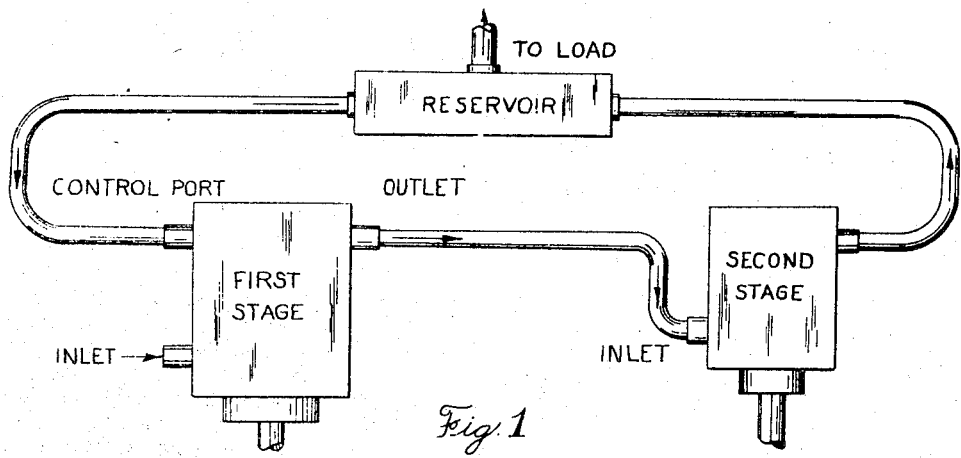
Fig. 1 is a schematic diagram of the connections employed when the compressor of this invention in installed in a two-way system.
Figure 2:
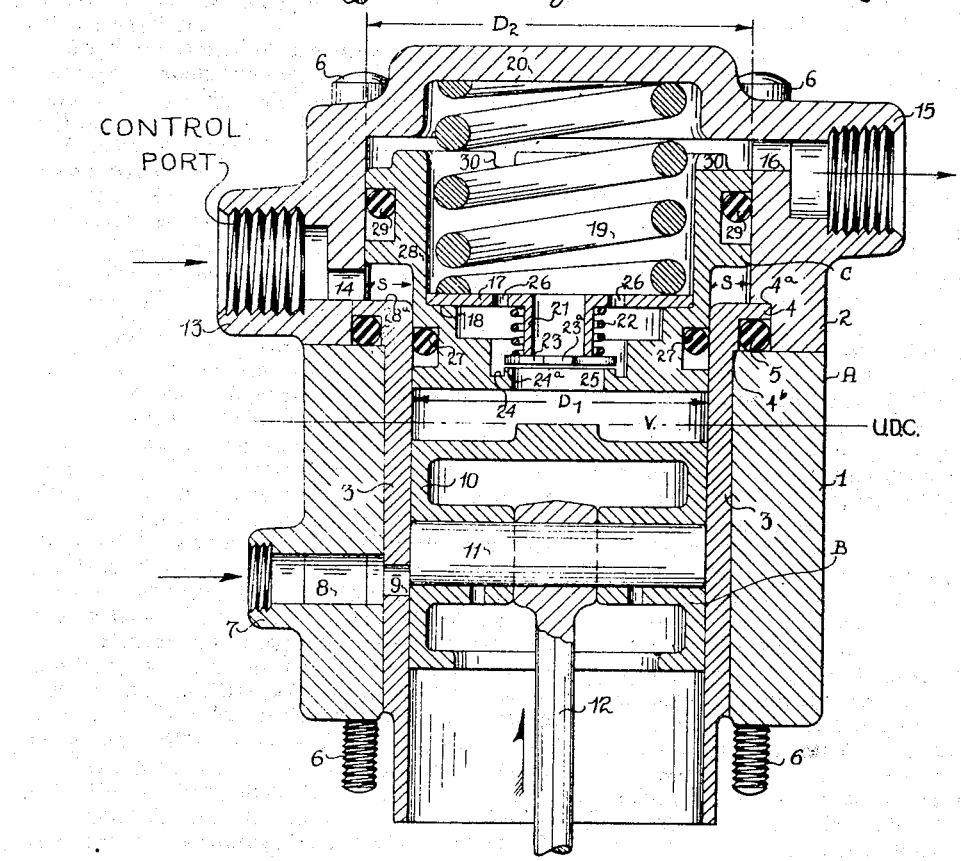
Fig. 2 is a section of the compressor with the movable cylinder head assuming the position tending to decrease compressor output.

The details of the first stage compressor construction appear in Fig. 2. The compressor includes a cylinder and body portion A, a piston B and an adjustable cylinder head C. The cylinder A includes a body portion 1, which in cooperation with a second body portion 2, retains a sleeve or liner 3 by means of a flange 4, which flange cooperates with a shoulder in body section 2. A second shoulder 4b is formed on the sleeve for cooperation with body section 1, this general arrangement serving to retain the sleeve 3 within the cylinder sections 1 and 2. As can be seen at 5, the cylinder body sections 1 and 2 and the sleeve 3 are so formed as to provide a recess for a sealing member, which member together with the joint arrangement produces the same result insofar as fluid flow is concerned as would be produced if the members were integral. A series of bolts 6 is provided to join parts 1, 2 and 3 together as well as to mount the entire assembly on a suitable support.

At the lower left of the cylinder body A can be seen the inlet nipple 7, the inlet passage 8 and another inlet port 9 formed in the sleeve 3. Piston B can be formed in accordance with standard practice having a skirt portion 10 and being driven by means of wrist pin 11 and connecting rod 12, the latter being connected to the crank shaft in accordance with the usual design. The stroke of piston B is such that inlet port 9 is opened to the cylinder near the end of the inlet stroke. The control port is formed in nipple 13 of the cylinder body A, the nipple being threaded and communicating with a passage 14 leading to the interior of the cylinder. At the upper right will be found the outlet nipple 15 communicating with a passage 16 in the cylinder wall to provide an outlet from the interior of the cylinder.

The movable cylinder head member C slides within the cylinder itself, it being generally formed with two external diameters. Diameter $D_1$ of the cylinder head engages the wall of the cylinder in which fits piston B, and diameter $D_2$ engages the wall of a larger chamber of the cylinder head C. Cylinder head C has several internal bores, the larger of which receives a member 17 which member is forced against a shoulder 18 on the cylinder head by a regulating spring 19. The spring 19 has its other end in engagement with the cap portion 20 of the cylinder. Member 17 is formed to provide a valve spring guide 21 which is surrounded by the valve spring 22 the latter engaging the check disc 23. Cylinder head C is formed with an annular groove 24 which leaves a valve seat 24a for cooperation with valve disc 23. An aperture 25 in the cylinder head permits air to flow past the check valve under pressure which air, in turn, passes through apertures 26 in member 17 and into the upper portion of the cylinder. Cylinder head C includes a sealing member 27 at its lower end and in the enlarged portion 28 is placed a second sealing member 29 for sealing relationship with the $D_2$ diameter of the cylinder. A shoulder 28a is formed at the junction of the two diameter sections of the cylinder which limits inward motion of the cylinder head.

At the upper right of cylinder member C can be seen a slot 30 one or more of which may be provided to permit air under pressure to leave the upper chamber of the cylinder and exhaust through outlet port 16 and nipple 5, even though member C be at its extreme upper position.

Having completed the description of the major parts of my improved compressor, the operation of the device will now be explained.

As an example of one use for my compressor, let us assume that it is desired to employ this compressor on an airplane and to so adjust the system that it will compress the desired amount of air at the maximum expected altitude without compressing an excess of air at sea level. Since air density decreases steadily with altitude it is apparent that a compressor which will produce an adequate supply of compressed air at the highest altitude where the air is of a relatively small density, will require some sort of control to prevent it from compressing an excess of air at sea level. Such a control is automatically and simply provided by my invention.

Assume that the first stage of the compressor is so adjusted that it will normally compress air to 100 pounds per square inch. Assume also that the second stage boosts this pressure four times which means that with all conditions normal the pressure in the reservoir will be at a pre-determined pressure of 400 p. s. i. Under these conditions examination of Fig. 2 will reveal that the pressure of 100 p. s. i. developed in the compressor cylinder acts to raise the cylinder head C over area $D_1$ and to lower cylinder head C over area $D_2$ the net result being a downward pressure tending to lower the cylinder C. This downward pressure acts on an annular area S, which area is equal to the difference between area $D_2$ and the area $D_1$. However, due to the fact that the control port is connected to reservoir pressure, that pressure acts upon the underside of flange 28 of cylinder head C, thereby acting over an area S in a direction tending to lift the cylinder head C. Since we have 100 p. s. i. tending to lower the cylinder head and 400 p. s. i. tending to lift it under normal conditions, the spring will be calibrated to exert a downward force of 300 p. s. i. to position the cylinder head in neutral equilibrium with all pressures at normal in the manner just described.

Figure 3:
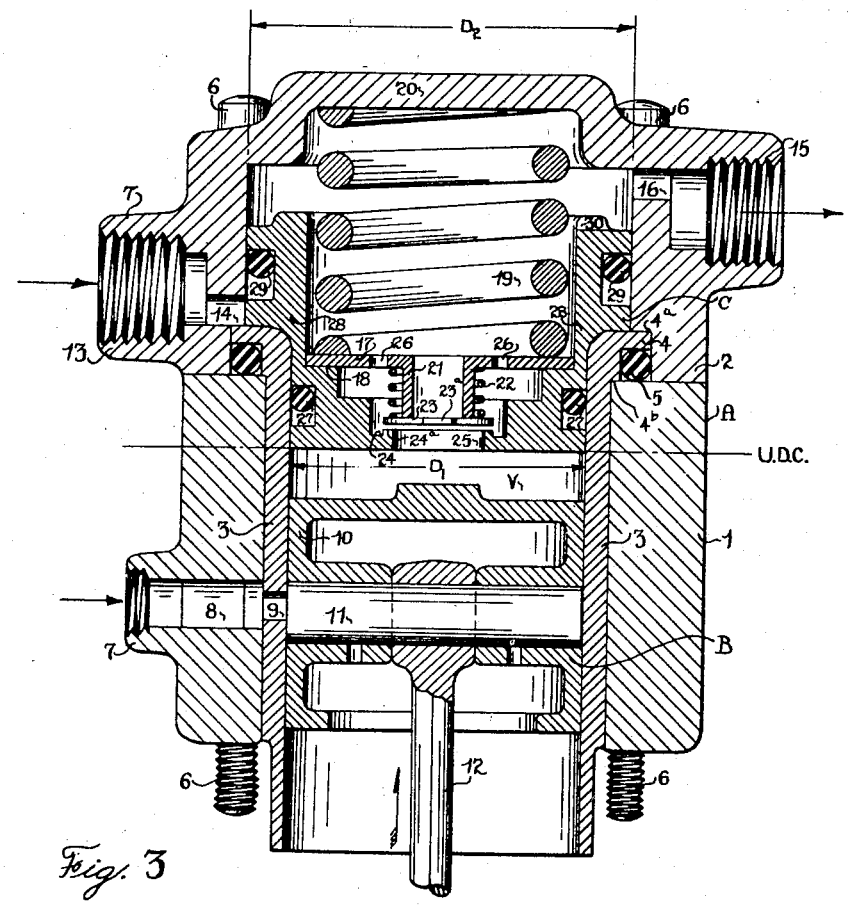
Fig. 3 is a section of the same compressor with the cylinder head in the position for maximum pumping.
Figure 4:
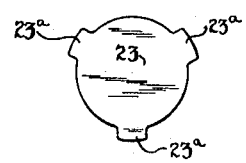
Figure 4 is a detail view of a valve in the piston.

As seen in Fig. 3, assume that the compressor is being operated at the highest altitude where the air is of low density. The device will be then designed so that movable cylinder head C will remain adjacent to its lower positon with flange 28 of the cylinder head close to or engaging the corresponding portion of the cylinder liner 3. Under these circumstances as the piston makes its compression stroke, clearance volume V is gradually decreased and when the piston reaches its upper dead center the clearance volume V is at its minimum value, the pressure in the reservoir never being high enough to overcome the spring. This means that substantially all the air which entered the cylinder when the inlet port was uncovered is forced through the aperture 25 past the check valve and out the outlet. With the device being set to give 400 pounds reservoir pressure at the highest altitude, assume now that the device is operated at a lower altitude. Here, as the piston uncovers the inlet port 9, since the air is more dense a greater weight of charge is admitted into the cylinder. For this reason, for a given piston position on the compression stroke, the pressure within the cylinder always tends to be greater at lower altitudes than at the higher altitudes. To return to our example, assume that at the lower altitude the pressure within the clearance volume V tends to reach a value of 110 p. s. i. instead of the predetermined value of 100. When this happens the second stage boosts the 110 p. s. i. four times to a value of 440 p. s. i., and the latter pressure acts on area S on the under portion of flange 28, tending to raise cylinder head C. As has been described previously, an unbalanced pressure of 110 p. s. i. within the upper portion of the compressor cylinder also acts on area S, but in a direction to lower cylinder head C. The difference between these pressures is now 330 p. s. i. whereas under normal conditions we have seen that it was 300 p. s. i. Since the spring is set to resist 300 p. s. i., an unbalance of 30 pounds now exists, which tends to lift cylinder head C and increase the clearance volume V. As the clearance volume is increased, pressure in the first stage drops off and that in the second stage drops off still more and this action takes place until tank pressure is back at its pre-set value.

The compressor is designed so that the relation of cylinder head inertia, spring pressure and piston speed is such that the movable cylinder head C is incapable of following the piston completely during the exhaust stroke. This means that in some cases the cylinder head C will tend to remain at a position representing the pre-determined mean effective pressure in the cylinder, and in no case will the cylinder head be able to make a complete stroke and so strike shoulder 28a of the cylinder.

It will be noted that the regulation in my compressor is provided by pressure from the second or last stage of the system. Since each stage boosts pressure created in the preceding stages, any pressure in the first stage is magnified so that the control pressure can be said to be extremely sensitive to pressure variations in the first stage.

The foregoing explanation of the operation of my compressor control has been made in connection with an aircraft installation which must compress air of different densities. However, my compressor control can be used to regulate the pressure of air in the receiver at any one altitude or density, the operation of the device being the same in either case. For example, assume that the spring is calibrated so that the movable cylinder head C moves to a position intermediate its full stroke when pressure within the system is at the pre-determined value and the piston is at upper dead center. Now assume that the demand of air or other fluid from the receiver is reduced so that pressure in the receiver tends to build up to a high value. With this, the control pressure will lift the cylinder head and reduce the clearance volume and hence the pressure developed in the first stage will decrease.

Likewise, if the pressure in the receiver becomes too low the system will work in the other direction and the spring will reduce the clearance volume V tending to increase pressure in the system.

Those skilled in the art will appreciate that modifications may be made in many of the designed details of my compressor without departing from the spirit of my invention. For example, the three part cylinder construction illustrated is merely designed for ease and simplicity of manufacture, the exact construction of the cylinder being subject to various modifications. Likewise the check valve in its method of mounting is merely one of many forms which can be satisfactorily provided, in accordance with standard practice. Furthermore, the exact number and type of inlet and outlet ports and their location can be modified without affecting the operation of the device. Although the device is illustrated and operated in a two-stage system, in actuality there may be any number of stages between the first stage which includes the control cylinder head, and the reservoir. These and various other changes in construction and arrangement of parts may be made without departing from the spirit of the invention as set forth in the appended claims.

Having thus described the present invention so that others skilled in the art may understand and practice the same, I state that what I desire to secure by Letters Patent is defined in that is claimed.

What is claimed is:

1. In combination in a compressor, a reciprocating piston and a cylinder, a movable member cooperating with said piston and cylinder to form the clearance volume of said cylinder, said movable member having an inlet port and a check valve therein, said movable member also having means arranged for communication with an exhaust port in said cylinder at all positions of said movable member, said movable member being spring loaded to reduce the clearance volume, said movable member being subjected to fluid pressure to increase said clearance volume, the relation of the inertia of said movable member, the force of said spring and the piston speed being such that said movable member makes only a partial stroke during a cycle.

2. In combination in a compressor, a reciprocating piston and a cylinder closed at one end, a member sliding in said cylinder between said piston and the closed end of said cylinder whereby two chambers are formed, the first chamber being between said piston and said sliding member and the second chamber between said member and the end of the cylinder, an exhaust port in said cylinder communicating with said second chamber, a check valve carried by said sliding member permitting fluid flow from said first chamber to said second chamber on the compression stroke, a spring acting on said sliding member tending to decrease the volume of said first chamber, and means on said sliding member adapted to receive pressure tending to increase the volume of said first chamber, said last named pressure being a function of the exhaust pressure.

3. In combination in a compressor, a reciprocating piston and a cylinder, said cylinder having a bore of two diameters the piston fitting the smaller of said bores, a movable member having portions fitting both bores and cooperating with said cylinder and piston to form the clearance volume, an exhaust port for said cylinder, said movable member carrying a check valve to permit communicating between said clearance volume and said exhaust port, a spring acting on said movable member tending to decrease the clearance volume, a control port in said cylinder connected to a source of pressure which is higher than, but a function of exhaust pressure, means on said movable member open to said control pressure and arranged so that said control pressure tends to increase the clearance volume in said cylinder.

4. A multi-stage compressor system comprising a plurality of compressors, the first stage compressor including a reciprocating piston and a cylinder, a movable member sliding in said cylinder and cooperating with said cylinder and piston to provide the clearance volume for said cylinder, an exhaust port for said cylinder, said movable member carrying a check valve to permit communication between said clearance volume and said exhaust port, a spring acting on said movable member tending to decrease the clearance volume, a control port in said cylinder in communication with the outlet of a succeeding stage compressor, means on said movable member open to said final stage pressure and so arranged that pressure in said succeeding stage tends to increase the clearance volume in said first stage compressor.

ROY O. BALOGH.

REFERENCES CITED

The following references are of record in the file of this patent:

UNITED STATES PATENTS

| Number | Name | Date |
| --- | --- | --- |
| 481,143 | Hutchinson | Aug. 16, 1892 |
| 520,349 | Zies | May 22, 1894 |
| 1,985,642 | Moody | Dec. 25, 1934 |
| 1,985,841 | Shephert et al. | Dec. 25, 1934 |